United States Patent
Wolfe

(10) Patent No.: US 7,354,164 B2
(45) Date of Patent: *Apr. 8, 2008

(54) DISPERSING AND POLARIZING LIGHT FILTER

(75) Inventor: Charles R. Wolfe, Palo Alto, CA (US)

(73) Assignee: Jenmar Visual Systems, Inc., Fremont, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 11/109,214

(22) Filed: Apr. 18, 2005

(65) Prior Publication Data

US 2005/0207017 A1    Sep. 22, 2005

Related U.S. Application Data

(63) Continuation-in-part of application No. 10/039,622, filed on Dec. 31, 2001, now Pat. No. 6,939,014.

(51) Int. Cl.
   *G02B 27/00* (2006.01)
(52) U.S. Cl. .................. 359/613; 359/614; 359/454
(58) Field of Classification Search ............... 359/601, 359/613, 614, 454
   See application file for complete search history.

(56) References Cited

U.S. PATENT DOCUMENTS 2,378,252 A    6/1945   Staehle et al.
5,563,738 A    10/1996  Vance
5,781,344 A    7/1998   Vance
5,932,342 A    8/1999   Zeira et al.
6,076,933 A    6/2000   DiLoreto et al.
6,417,966 B1   7/2002   Moshrefzadeh et al.
6,468,378 B1   10/2002  Hannington
6,600,599 B2   7/2003   Hannington
6,695,453 B2   2/2004   Hannington
6,939,014 B1 * 9/2005   Vance et al. ............... 359/613
2002/0034618 A1 * 3/2002 Moshrefzadeh et al. .... 428/206

FOREIGN PATENT DOCUMENTS

JP    03-002855    1/1991
JP    05-216121    8/1993

* cited by examiner

Primary Examiner—Joshua L Pritchett
(74) Attorney, Agent, or Firm—Fenwick & West LLP

(57) ABSTRACT

An optical filter includes an array of light-transmissive beads in a matrix of opaque binder that surrounds one portion of the beads to provide light entrances and exit apertures for incident light to pass substantially only through the beads. A polarizing layer is disposed between the apertures and the viewing surface of the filter for improved rejection of ambient light. The polarizing layer transmits linearly polarized image light aligned with the polarization axis while attenuating randomly or orthogonally polarized ambient light, resulting in improved image contrast.

10 Claims, 10 Drawing Sheets

DISPERSING AND POLARIZING LIGHT FILTER

RELATED APPLICATIONS

This application claims priority under 35 U.S.C. § 120 as a continuation-in-part of U.S. patent application Ser. No. 10/039,622, filed on Dec. 31, 2001, entitled "Light Transmissive Filter Having Anisotropic Properties and Method of Fabrication," by Charles Robert Wolfe and Dennis W. Vance, now issued as U.S. Pat. No. 6,939,014, the subject matter of this application also is related to commonly-owned U.S. patent application Ser. No. 10/360,470, filed on Feb. 7, 2003, entitled "Method And Apparatus For Correcting Visual Aberrations In Image Projection Systems," by Charles Robert Wolfe, now issued as U.S. Pat. No. 6,867,928, and U.S. patent application Ser. No. 10/211,785, filed on Aug. 1, 2002, entitled "Lens Optimization For Image Projection Systems," by Charles Robert Wolfe, now issued as U.S. Pat. No. 6,700,713, the subject matter of which applications are incorporated herein in the entireties by this reference hereto.

FIELD OF THE INVENTION

This invention relates to the field of light filters, and more particularly to light filters with improved rejection of ambient light.

BACKGROUND OF THE INVENTION

Rear projection screens and light diffusers include light filters which provide an optically dispersing medium for transmitting light from an image source on one side of the screen to a viewer on the opposite side of the screen. A basic refractive light filter has been described in U.S. Pat. No. 2,378,252, which includes a refracting lens system as its principal component. The refracting lens system comprises an array of spherical transparent beads embedded in an opaque binder layer and mounted on a transparent support material. Certain known light filters orient the bead layer toward the image source and the transparent support material toward the viewers. (See, for example, U.S. Pat. No. 5,563,738).

The opaque binder layer affixes the beads to the support material, reduces the reflectivity of the filter, and reduces the amount of light transmitted through the interstices between the beads of the lens system. Light from an image is refracted by the beads and dispersed to the viewer through a transmission area of the beads. This transmission area includes an aperture about the point of contact between the bead and support material and the area surrounding this point where the opaque binder layer is too thin to absorb the refracted light.

Rear projection screens and light diffusers are characterized by their ambient light rejection, resolution, gain, and contrast as properties that are determined by the structure and composition of the component materials. For example, in traditional light filters the ambient light rejection and contrast of the light filter are determined largely by the opacity of the binder layer.

However, such traditional light filters still allow a significant amount of ambient light to be reflected from the viewing surface of the filter, decreasing the contrast of the filter. The brightness of traditional beaded screen light filters may be increased by reducing the opacity of the binder layer. However, increasing brightness in this manner would result in reduced contrast for the light filter.

SUMMARY OF THE INVENTION

A multi-layer light filter in accordance with the present invention includes a single layer of glass or resin beads supported in an opaque layer, and includes an additional polarizing layer that transmits linearly polarized image light that is aligned with the polarization axis of the polarizer and blocks or absorbs a fraction of randomly polarized ambient light and ambient light not polarized in alignment with the polarizer. This structure of optical components enhances the contrast relative to non-polarizing light filters. Contrast is improved by linearly polarizing image light while allowing orthogonally or randomly polarizing ambient light, thereby attenuating ambient light. The improved contrast is maintained at various viewing angles, as viewed from the viewer side of the light filter. The improvement in contrast is symmetric, i.e., equivalent for horizontal and vertical angles alike.

DETAILED DESCRIPTION OF THE INVENTION

Figure 1:
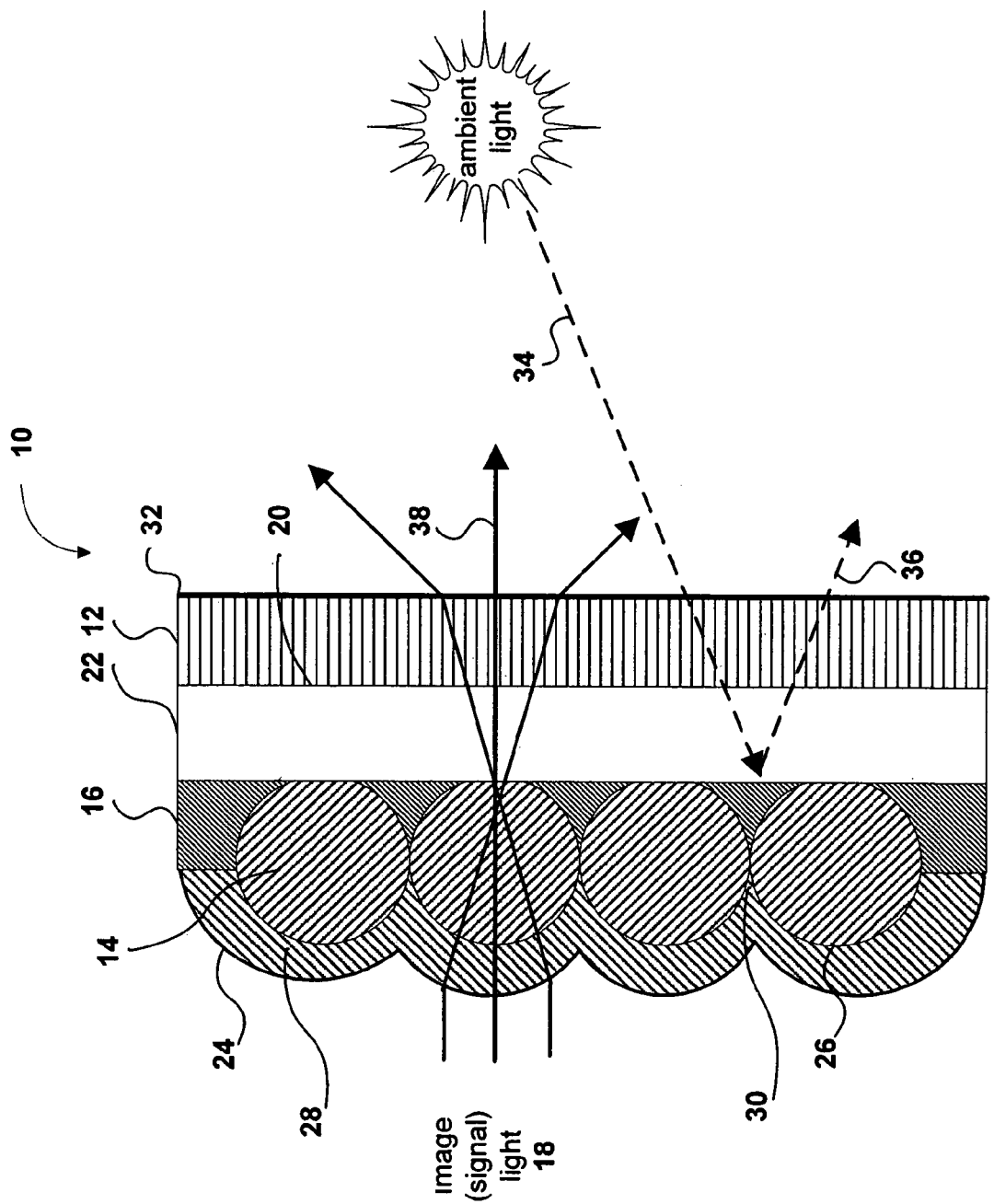
FIG. 1 is a sectional view of a segment of a non-polarizing prior art light filter according to one embodiment of the present invention.

Referring now to FIG. 1, there is shown a sectional view of a segment of a conventional non-polarizing beaded light filter 10. This conventional filter 10 includes a transparent support layer 12 in contact with a plurality of spherical glass or resin transparent beads 14 that are oriented substantially in contiguous array. This allows transmission of light 18 through a plurality of transmission apertures 20 and through the support layer 12 for viewing at different horizontal or vertical viewing angles. The beads 14 each have a radius about equal to a selected value R. The interstices (30)

between beads 14 on the support layer 12 are filled with an opaque layer 16 that inhibits the passage of incident light 18 through the filter 10 otherwise than through the front center of the beads 14. Transparent support layer 12 is laminated to the beads 14 and opaque layer 16 by a transparent layer of pressure-sensitive adhesive (PSA) 22.

The light filter 10 may include an additional conformal layer of light transmissive material 24 disposed over the protruding beads 14 to a substantially uniform thickness between about 0.1 R and 1.0 R, the thickness measured normal to the protruding spherical surfaces 26 of the beads 14.

The conformal layer 24 defines a plurality of lenses 28 for reducing dispersion of incident light and increasing the transmittance of the light filter 10. Each such lens 28 is disposed on the protruding spherical surface 26 of a bead 14 and has a substantially spherical or curved incident surface with a radius of curvature about 1.1 to 2 times the radius of the bead 14 or an average thickness around the beads of about 0.1 to 1 times the radius of the beads 14.

Light 18 that is approximately collimated from an effectively distant image source 18 is incident on filter 10 at back surfaces 26 of beads 14 and back surface 30 of the opaque binder layer 16 between the beads 14. These surfaces define an incident or image side of light filter 10. Outer surface 32 of the support layer 12 may define a front or viewing side of light filter 10 through which viewers observer the transmitted image light. Thus, light 18 incident on beads 14 is refracted and transmitted through the beads 14 and the associated transmission apertures 20, and passes through the support layer 12 to emerge as signal light 38. Light 18 incident on back surface 30 of binder layer 16 between beads 14 is absorbed to reduce transmission of this light through the filter 10.

For the light filter 10 illustrated in FIG. 1, ambient light incident 34 on the viewing surface 32 may be partially reflected 36 at the viewing surface 32, at the interface between the opaque layer 16 and transparent support layer 12, and at the interface between the beads 14 and transparent support layer 12. Such ambient light reflecting off the light filter 10 can reduce contrast of the viewing image. To reduce ambient light reflecting 36 off the viewing surface 32, in one embodiment, the outer surface 32 of the transparent support layer 12 may include an anti-reflective (AR) or anti-glare (AG) coating. However, the light filter 10 of FIG. 1 still allows for significant reflection of ambient light 36.

Figure 2A:
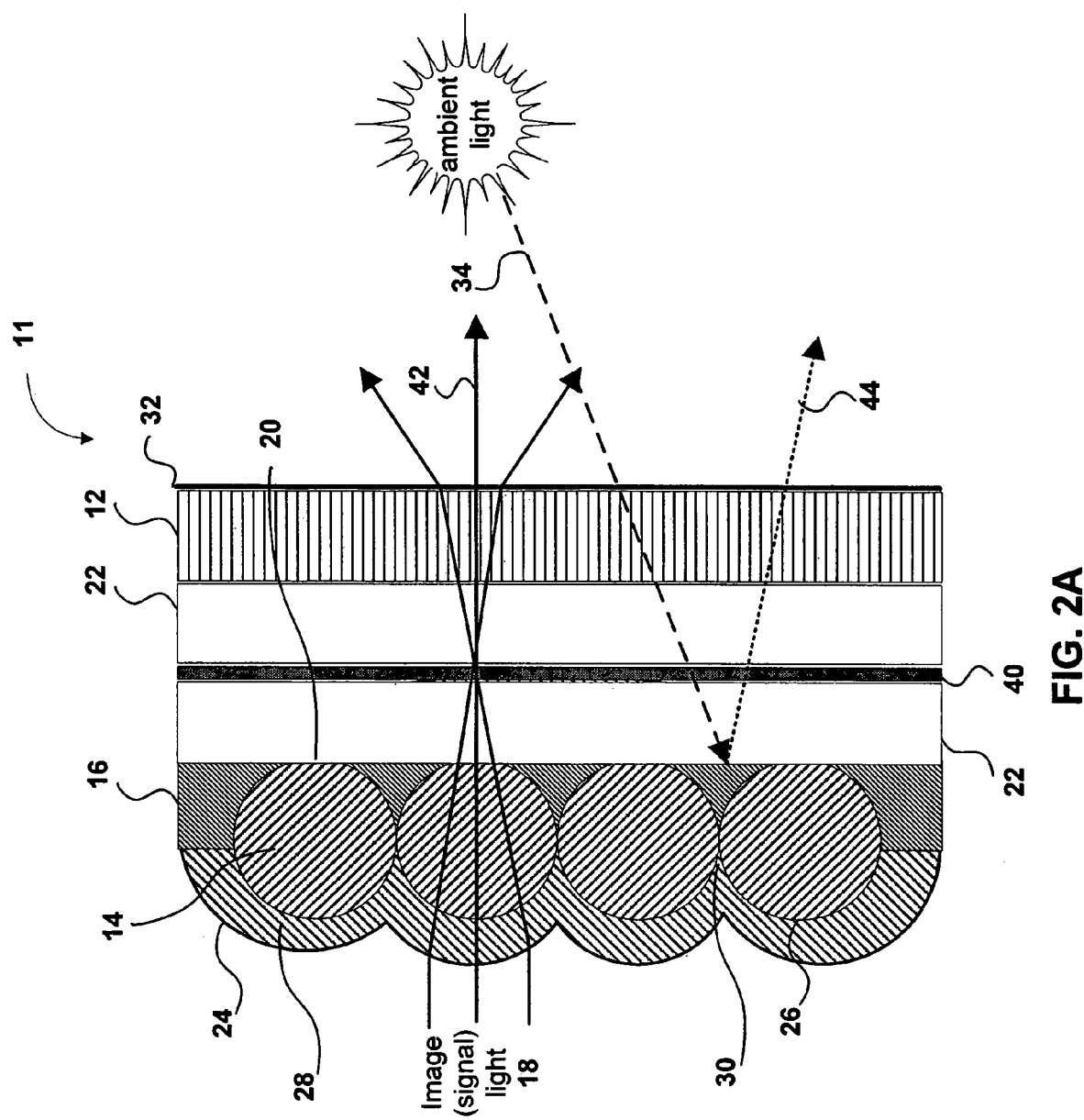
FIG. 2A is a sectional view of a segment of a polarizing beaded light filter according to one embodiment of the present invention.

Referring now to FIG. 2A, there is shown a sectional view of a segment of a polarizing beaded light filter 11 according to one embodiment of the present invention. The polarizing light filter 11 includes beads 14 and an opaque layer 16, a transparent support layer 12, and a conformal layer 24 on the incident light 18 side of the polarizing filter 11. A transparent support layer 12 contacts a plurality of spherical glass or resin transparent beads 14 that are oriented substantially in contiguous array. The interstices between beads 14 and the support layer 12 are filled with an opaque layer 16 that inhibits the passage of incident light 18 through the filter 11 otherwise than through the front center of the beads 14. Transparent support layer 12 is laminated to the beads 14 and opaque layer 16 by a layer of pressure-sensitive adhesive (PSA) 22.

Light 18 that is approximately collimated from an effectively distant image source 18 is incident on filter 11 at back surfaces 26 of beads 14 and back surface 30 of the opaque binder layer 16 between the beads 14. Thus, light 18 incident on beads 14 is refracted, transmitted through the beads 14 and the associated transmission apertures 20, and passes through the support layer 12, emerging as signal light 42. Light 18 incident on back surface 30 of binder layer 16 between beads 14 is absorbed to reduce transmission of this light through the filter 11.

In addition, the polarizing filter 11 has a second layer of pressure sensitive adhesive 22, and a linear polarizing layer 40 sandwiched in between the PSA layers 22. The additional linear polarizing layer 40 has a two-fold effect on rejection of ambient light 34. Image light 18 passes through the filter 11 and emerges polarized 42 from the viewing surface 32, in contrast to emerging light 38 of the non-polarized filter 10 of FIG. 1. This polarization of image light 18 is linear, in a direction determined by the polarization axis of the polarizer layer 40. In addition, ambient light 34 incident upon the filter 11 passes through the polarizing layer 40 twice. The ambient light 34 passes through the polarizing layer 40 once before the ambient light 34 reaches the opaque layer 16 and again after the light partially reflects from the opaque layer 16. As a result, a fraction of the ambient light (that which is polarized orthogonal to the polarizing axis of the polarizer) 34 incident upon the filter 11 is blocked or extinguished by the polarizing layer. This effect significantly attenuates the amount of the reflected ambient light 44 as seen by the viewer. The combination of linear polarization 42 of the incident light 18 and the random or orthogonal polarization of the ambient light 34 results in improved contrast over non-polarizing filters, e.g., light filter 10 of FIG. 1. In addition, the improved brightness is achieved without attenuation of the image light 18.

In one embodiment, the polarizing layer 40 is positioned between the transparent support layer 12 and the beads 14 and opaque layer 16. The light filter 11 of FIG. 2A shows this embodiment, with the polarizing layer adjacent to the beads 14 and opaque layer. However, the polarizing layer can be placed anywhere between the bead apertures 20 and the source of ambient light 34.

Figure 2B:
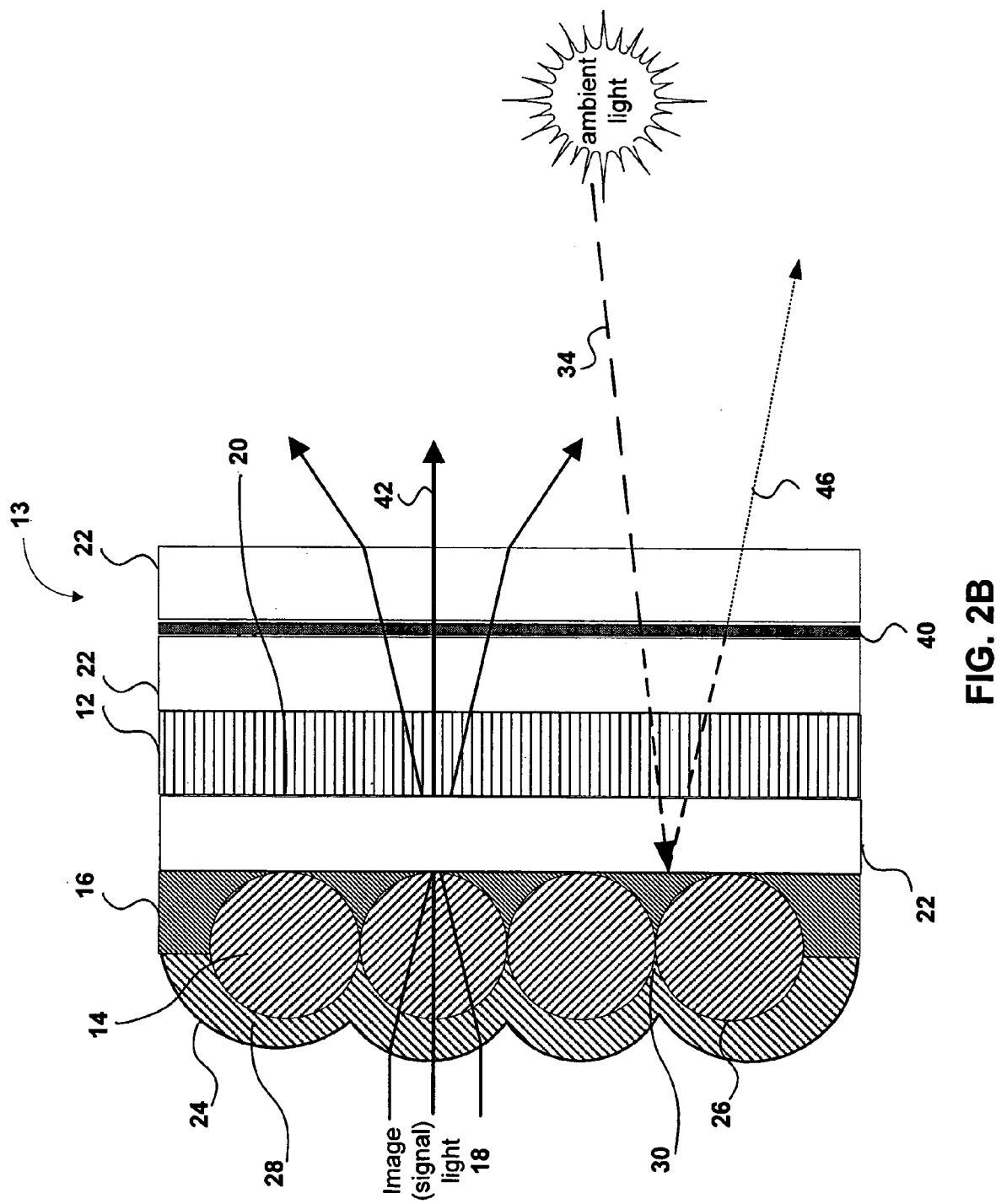
FIG. 2B is a sectional view of a segment of a polarizing beaded light filter according to another embodiment of the present invention.

For example, referring now to FIG. 2B, there is shown a sectional view of a segment of a polarized beaded light filter 13 according to another embodiment of the present invention. In this embodiment, the polarizing layer 40 is on the viewing surface 32 side of the support layer 12. Ambient light 34 still passes twice through the polarizing layer 40, with similar attenuation effects. Specifically, ambient light incident upon the filter 13 passes through the polarizing layer 40 a first time. Then, after passing through the support layer 12, the ambient light 34 is partially reflected off the opaque layer 16, and passes through the polarizing layer 40 a second time, emerging significantly attenuated 46.

In addition, ambient light rejection in the light filter of the present invention, e.g. light filters 11 and 13, is affected by the opacity of binder layer 16. Thus, if the opacity of binder layer 16 is increased to improve ambient light rejection, the amount of image light 18 transmitted through the transmission apertures 20 around the point of contact between beads 14 and transparent support layer 12 decreases.

The light filters 11, 13 may include an additional conformal layer of light transmissive material 24 disposed over the protruding beads 14 to a substantially uniform thickness between about 0.1 R and 1.0 R, the thickness measured normal to the protruding spherical surfaces 26 of the beads 14.

The conformal layer 24 defines a plurality of lenses 28 for controlling dispersion of incident light and increasing the transmittance of the light filter 10. Each such lens 28 is disposed on the protruding spherical surface 26 of a bead 14 and has a substantially spherical or curved incident surface with a radius of curvature about 1.1 to 2 times the radius of the bead 14 or an average thickness around the beads of about 0.1 to 1 times the radius of the beads 14.

In addition, in one embodiment, the outer surface 32 of the transparent support layer 12 of the polarized light filters 11, 13 may include an anti-reflective (AR) or anti-glare (AG) coating to further reduce the effects of ambient light. Examples of the effects of the polarizing layer are described herein in greater detail with respect to FIGS. 3A-C and FIG. 4.

Figure 3A:
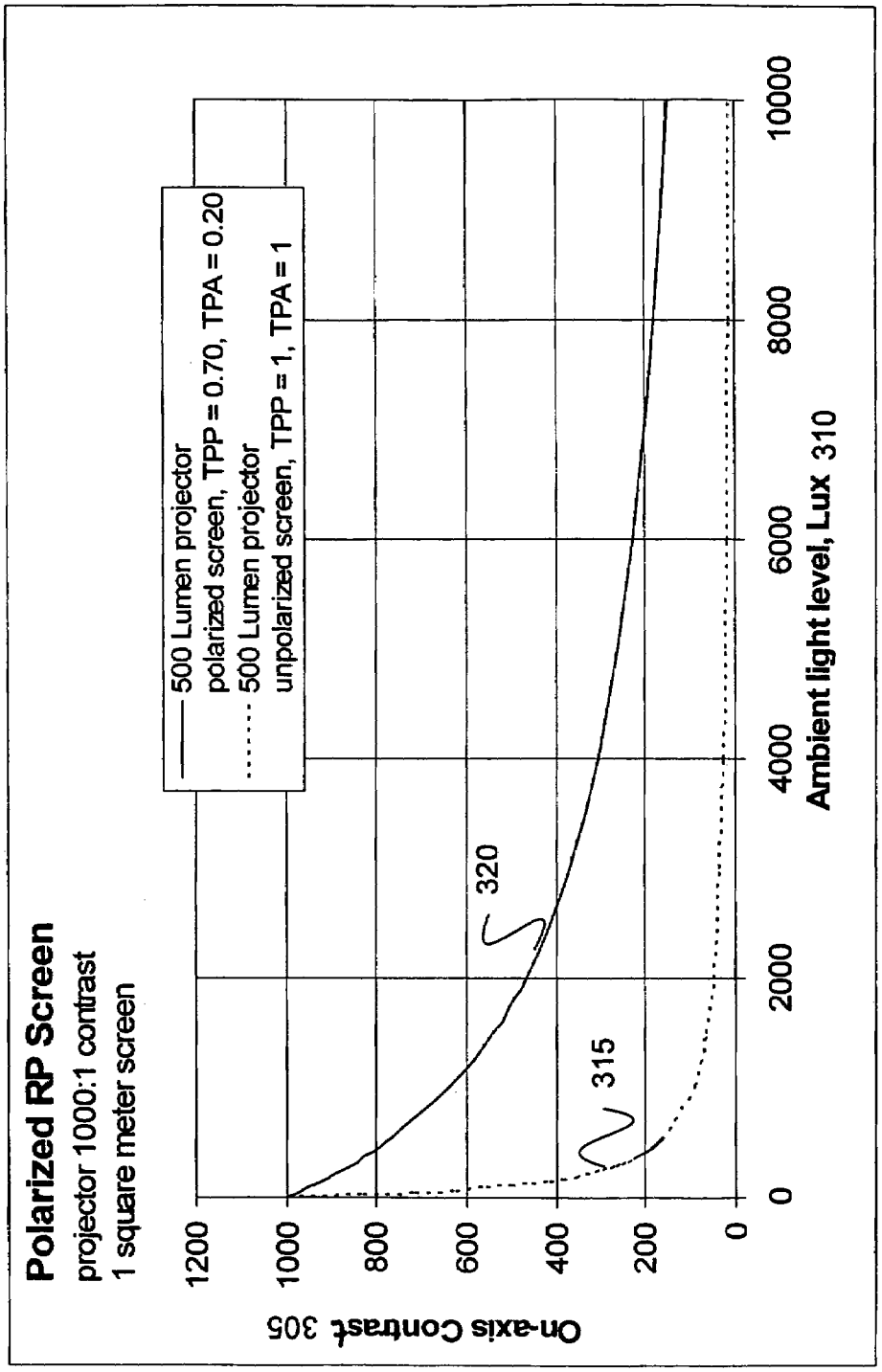
FIG. 3A is a graph comparing on-axis contrast of a non-polarizing and a polarizing light filter for various ambient light levels according to one embodiment of the present invention.

FIG. 3A is a graph comparing on-axis contrast of a non-polarizing and a polarizing light filter for various ambient light levels according to one embodiment of the present invention. On-axis contrast is the contrast of the light filter screen viewed at a 90-degree angle with the surface of filter, i.e., viewed from directly in front of the screen. The dotted line 315 represents contrast at various ambient light levels for a non-polarized light filter. The solid line 320 represents contrast at various ambient light levels for a polarizing light filter such as described in the various embodiments of the present invention. The ambient light level is measured in lux, the International Standard (SI) unit of measure for luminous flux density at a surface. One lux equals one lumen per square meter. In the embodiment depicted in FIG. 3A, the polarizing light filter 320 polarizing layer has a single-pass transmission for aligned polarized light (TPP) of 0.70 a single-pass transmission of unpolarized ambient light (TPA) of 0.20. Note that both the TPP and TPA for the non-polarizing filter equal 1 (i.e., there is no polarizing layer). The extinction of the polarizer layer is given by the ration TPP/TPA. In FIG. 3 this ratio equals 3.5, which is typical of a class of low cost liquid crystal polarizing materials manufactured by Optiva, Inc. of South San Francisco Calif. As indicated in FIG. 3A, the screen in this example is sized one square meter, and the projector has a contrast of 1000:1 and output of 500 lumens.

As shown by FIG. 3A, contrast is greater for the polarizing light filter than for the non-polarizing filter at all light levels. Significantly, at 500-1000 lux, the level of light common in offices, the increased contrast is most significant for the polarizing filter. In addition, at 10,000 lux, which approximates outdoor sun light, a significant level of increase in contrast still can be seen in the contrast of the polarizing filter over the non-polarizing filter.

Figure 3B:
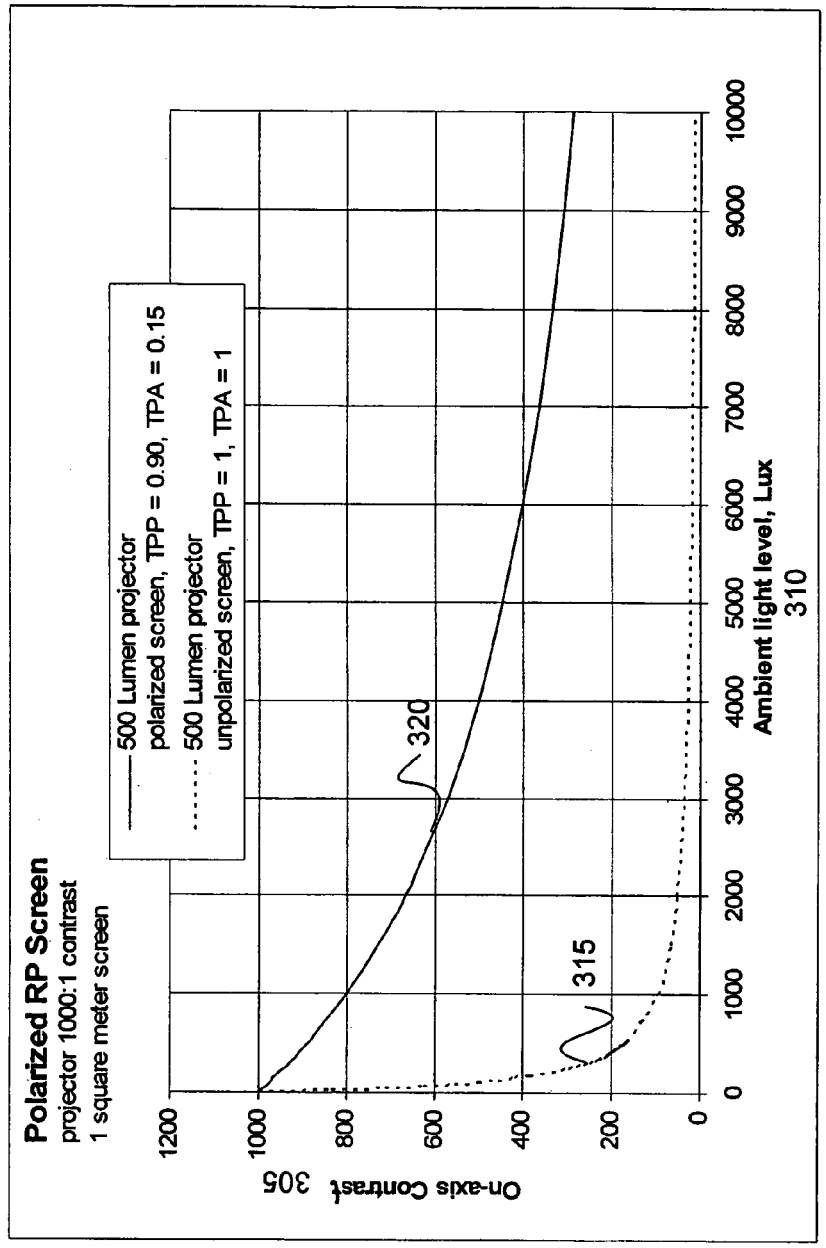
FIGS. 3B and 3C are graphs comparing on-axis contrast of a non-polarizing and a polarizing light filter for various ambient light levels according to two embodiments of the present invention.
Figure 3C:
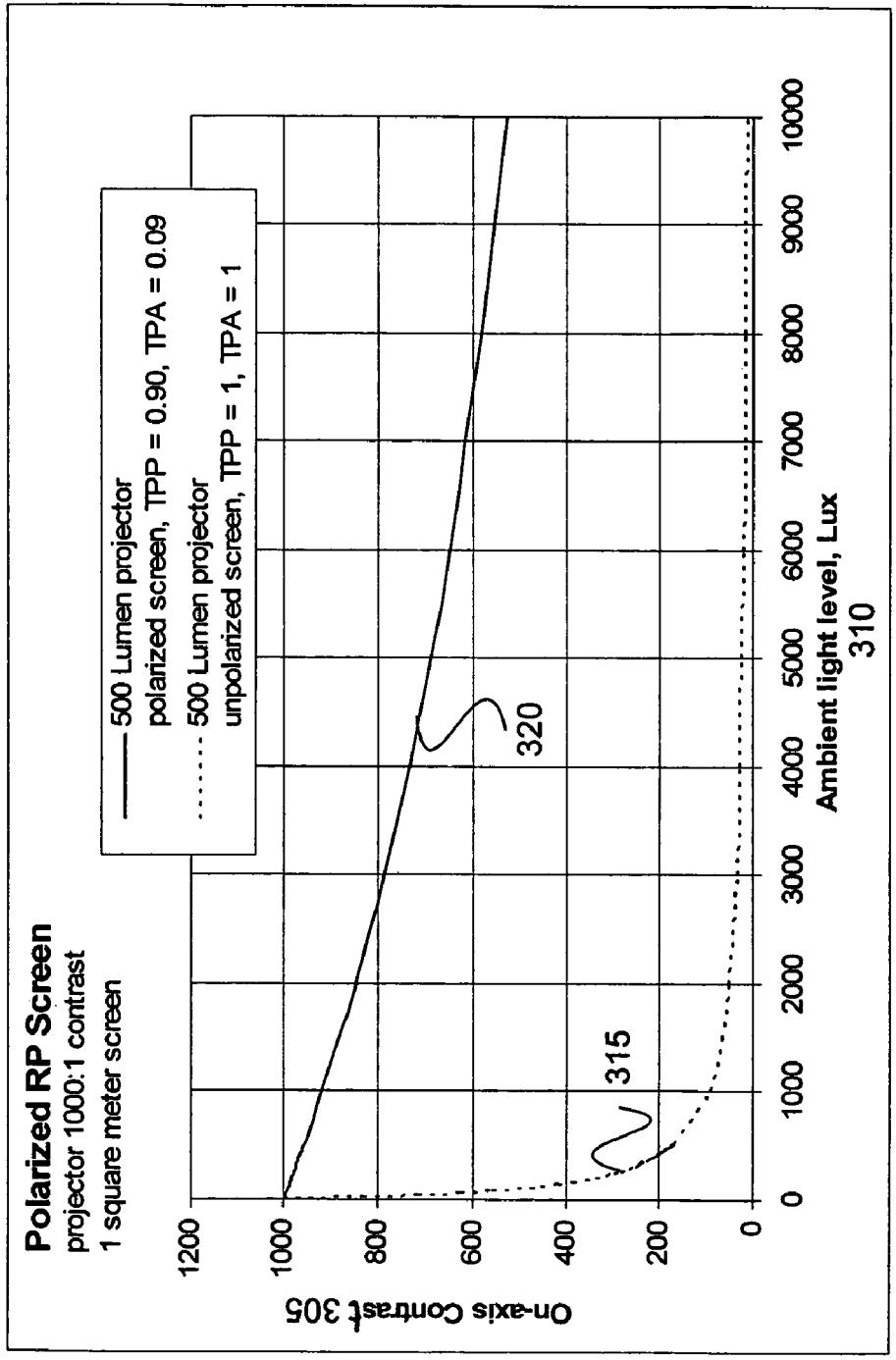

FIGS. 3B and 3C are graphs comparing on-axis contrast of a non-polarizing and a polarizing light filter for various ambient light levels according to two embodiments of the present invention. These figures illustrate how the contrast is further increased at various light levels when the polarizing layer extinction increases. In the embodiment depicted in FIG. 3B, the polarizing light filter 320 polarizing layer has a single-pass transmission for aligned polarized light (TPP) of 0.90 a single-pass transmission of unpolarized ambient light (TPA) of 0.15. Thus, the polarizing layer extinction is 6.0. In the embodiment depicted in FIG. 3C, the polarizing light filter 320 polarizing layer has a single-pass transmission for aligned polarized light (TPP) of 0.90 a single-pass transmission of unpolarized ambient light (TPA) of 0.09. Thus, the polarizing layer extinction is 10.0. The TPP and TPA for the non-polarizing filter in FIGS. 3B and 3C equals 1 (i.e., there is no polarizing layer).

In the various embodiments, the thickness of the polarizing layer should be such that it does not add significantly to the total thickness of the film layers applied to the surface of the support layer 12. The support layer thickness typically ranges 0.100"-0.200" for rigid materials; 0.010"-0.020" thickness is typical for flexible, roll-up support materials. Typically, the thickness of the polarizing layer is much less, <10 microns typically are achieved.

Figure 4:
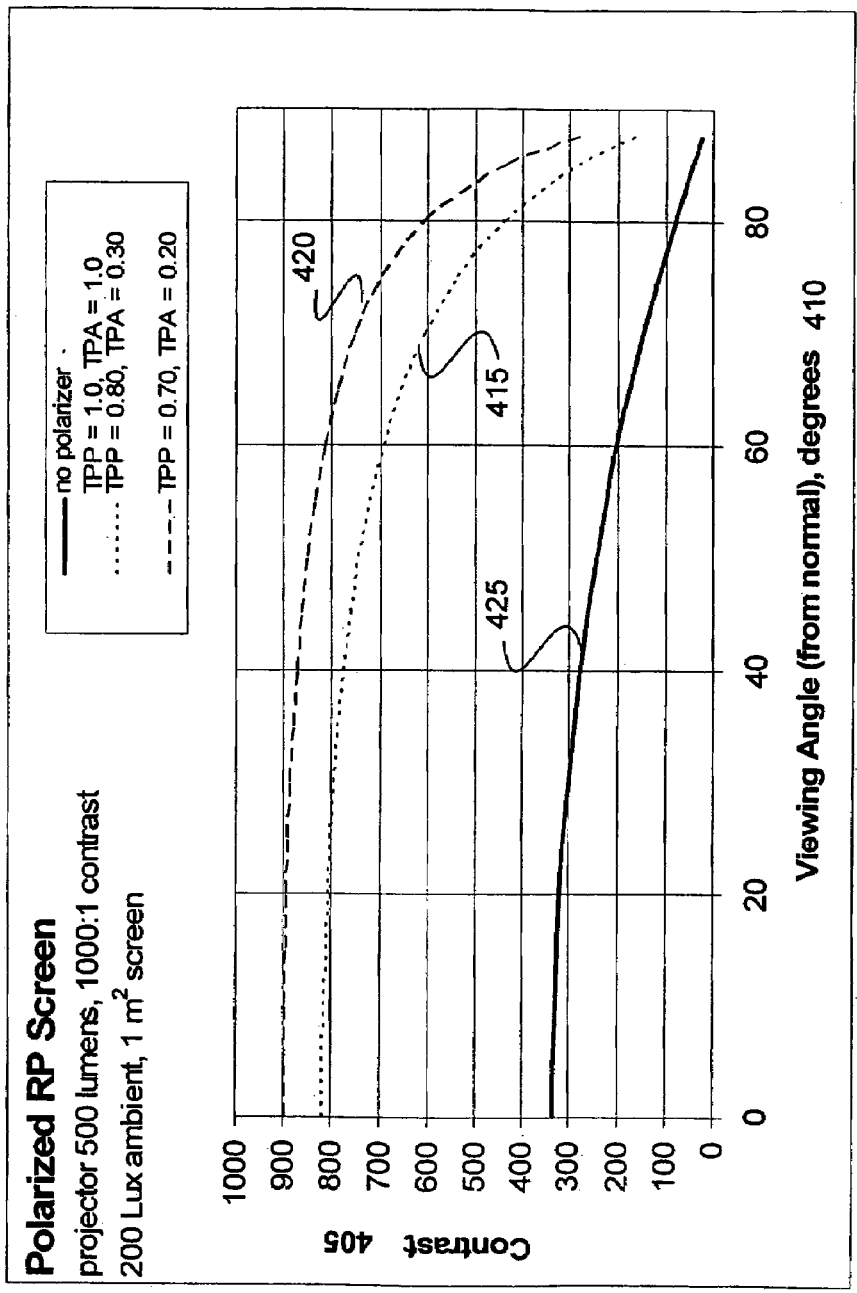
FIG. 4 is a graph comparing contrast of a non-polarizing and two polarizing light filters at various viewing angles according to one embodiment of the present invention.

The graph of FIG. 4 shows f two polarizing light filters (lines 415, 420) with significant gains in contrast over a non-polarizing light filter (line 425) at various viewing angles. Note that the increased contrast has circular symmetry in the viewing space, i.e., the angles listed are measured from either left or right, or up or down relative to on-axis viewing. In this figure, the ambient light level remains constant (at 200 lux), and the plots show contrast 405 for various viewing angles 410, as measured from normal (on-axis) viewing.

The solid line 425 of FIG. 4 represents the contrast level of a non-polarizing light filter, and the dotted 415 and dashed 420 lines respectively represent contrast levels for polarizing light filters in accordance with the present invention. Both polarizing light filters 415, 420 show significant increases in contrast at all viewing angles over the non-polarizing light filter 425. This increase is most pronounced at viewing angles commonly encountered, i.e., 0-45 degrees in either direction from on-axis viewing, although contrast improvement is achieved at high incident angles (glancing incidence) also.

The polarizing light filter represented by the dashed line 420 shows an even greater increase in contrast over the non-polarizing filter 425 than does the polarizing filter shown by the dotted line 415. Note that the transmission of both polarized image light (TPP) and unpolarized ambient light (TPA) are different between these filters. Both the TPP and the TPA of the polarizing filter 420 have reduced values compared with these parameters of the polarizing filter 415. The fact that contrast is increased despite the reduction of image light (TPP), indicates that reduction of ambient light (TPA) has a larger effect upon contrast.

Therefore, improved contrast may be established using filter structures according to the present invention that promote greater rejection of ambient light in comparison with non-polarizing light filters.

Light filters of the type described in this patent are commonly made by first preparing the layered materials in film form by roll coating. For example, the beaded structure, the pressure sensitive adhesive (PSA), the anti-glare (AG) film, anti-reflection (AR) film and polarizing layer materials are commonly made as films and supplied in roll form. Screen manufacturing typically involves two lamination processes: roll-to-roll lamination and roll-to-sheet lamination.

Figure 5:
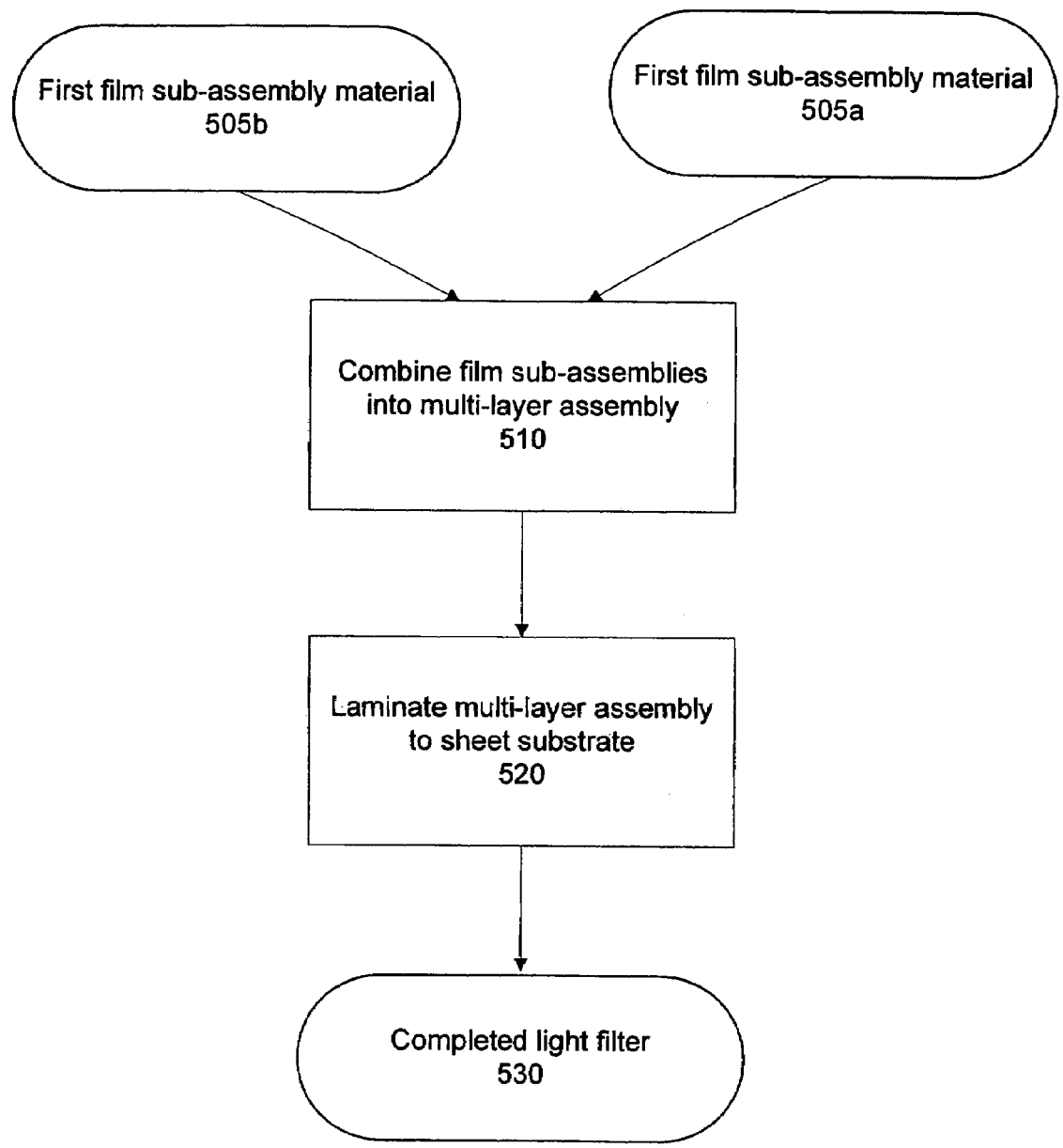
FIG. 5 is a flowchart illustrating a method of manufacture of a light filter according to one embodiment of the present invention.

FIG. 5 is a flowchart illustrating a method of manufacture of a light filter according to one embodiment of the present invention. The process begins with two film sub-assembly materials 505 in rolls. Using roll-to-roll lamination, the two film sub-assembly materials 505a, 505b are combined 510 into a multi-layer assembly. In one embodiment, the sub-assembly materials 505 are pressure-sensitive adhesive (PSA) 505a, which is applied to the front surface of a beaded film 505b to produce a multi-layer assembly 615. This embodiment is depicted in FIG. 6.

Figure 6:
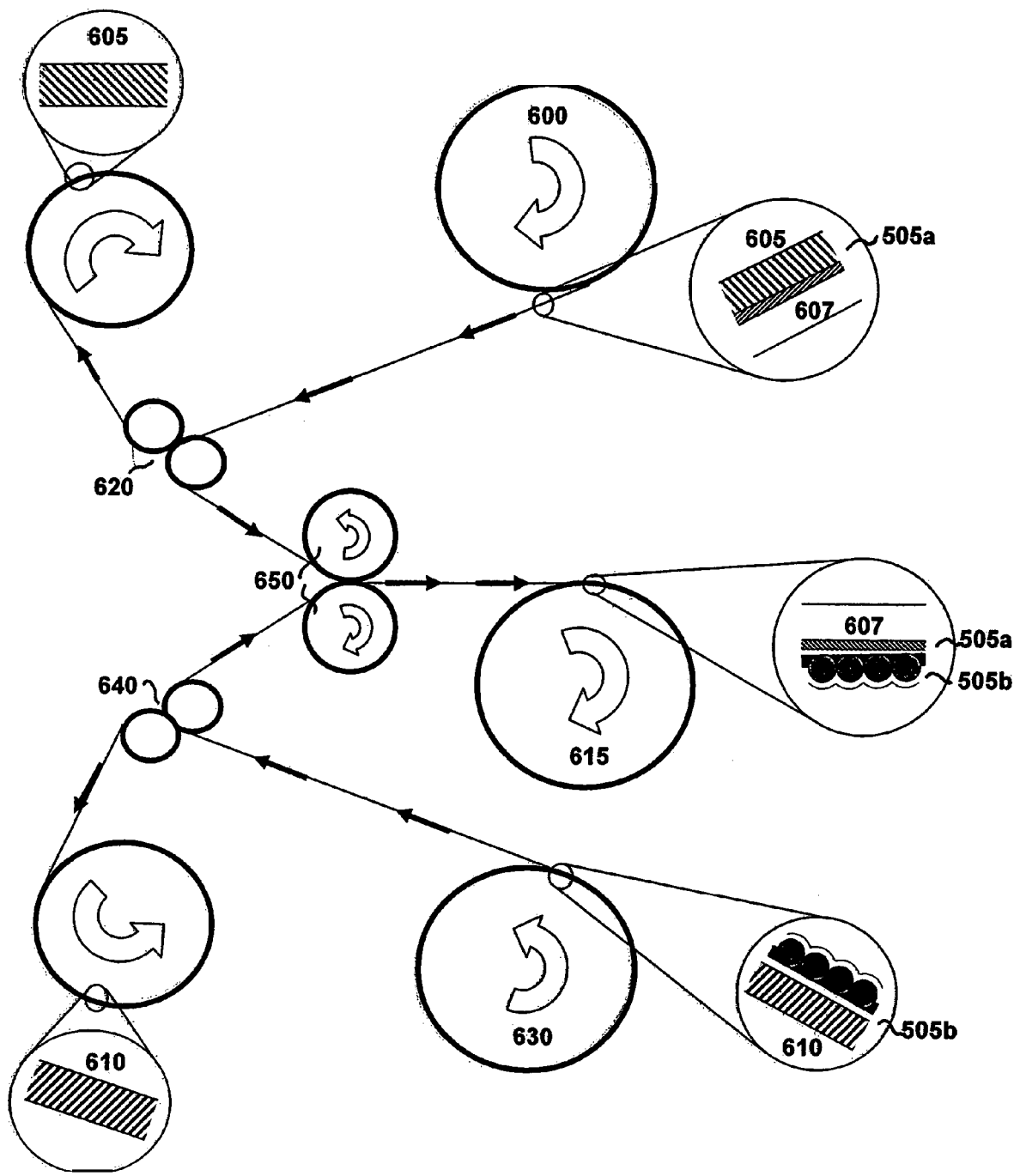
FIG. 6 is a process schematic of a roll-to-roll lamination process according to one embodiment of the present invention.

In the embodiment of FIG. 6, the process begins with a supply roll (600) of PSA 505a sandwiched between two release liners 605, 607. The first sub-assembly (e.g., PSA 505a) is separated 620, releasing it from one of the liners 605. In addition, a supply roll (630) of the second sub-assembly (e.g., beaded film 505b) on a release liner 610 is separated 640. Then, the two sub-assemblies are combined (step 510 of FIG. 5), e.g., PSA 505a (with liner 607) and beaded film 505b are combined, or laminated, using soft rollers 650 that can apply both heat and pressure, or only pressure to the layers 505. The result is a multi-layer assembly 615 that includes the PSA 505*a* with liner 607 and the beaded film 505*b*.

Other examples of sub-assembly materials 505 that may be combined include: applying PSA to the back surface of an anti-glare or anti-reflective film, applying PSA to the polarizing layer, or applying the polarizing layer/PSA sub-assembly to the beaded film/PSA sub-assembly.

Figure 7:
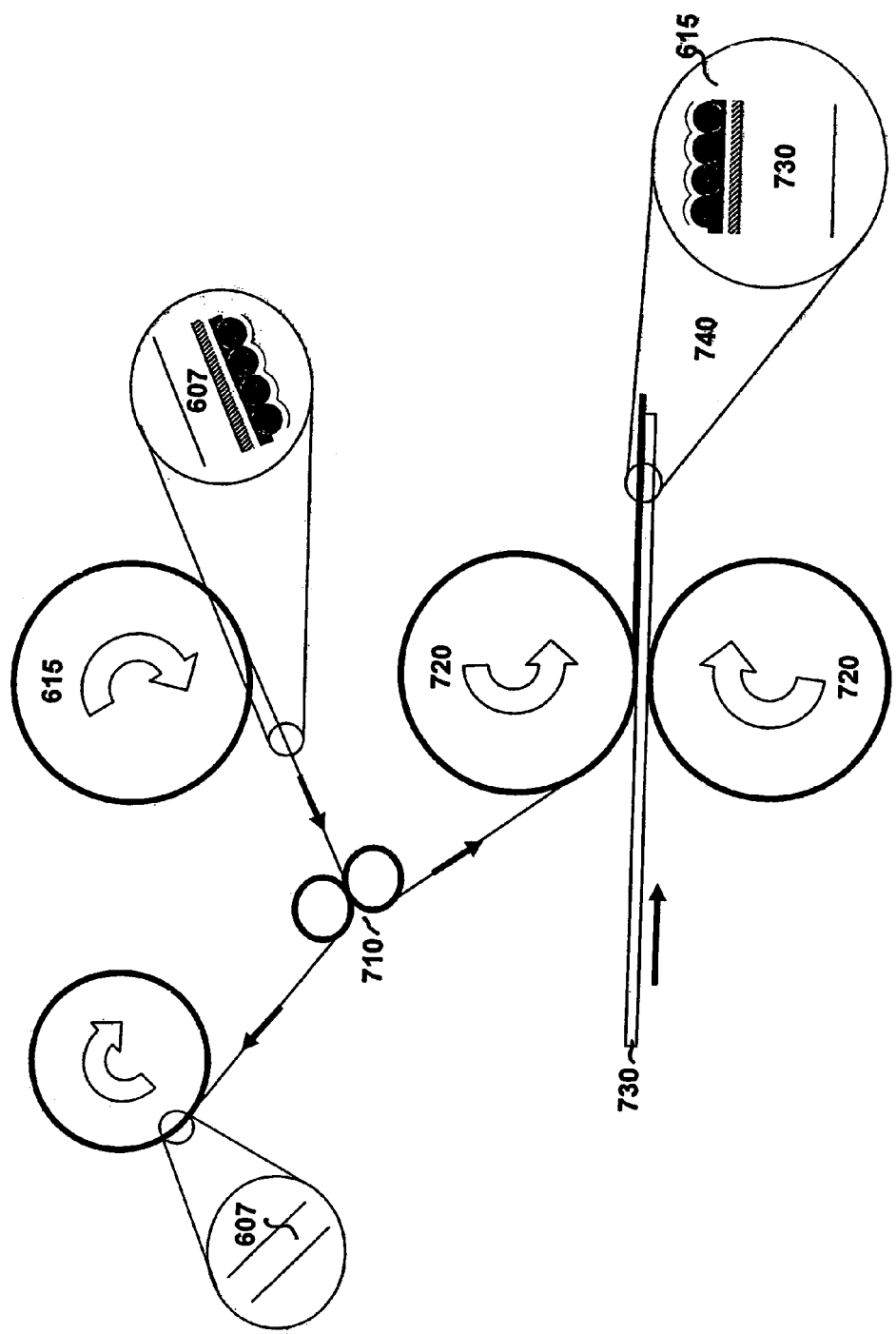
FIG. 7 is a process schematic of a roll-to-sheet lamination process according to one embodiment of the present invention.

Referring again to FIG. 5, the multi-layer assembly is then laminated to a sheet substrate using a roll-to-sheet lamination process. This step produces a light filter end product 530. FIG. 7 depicts an example of the roll-to-sheet lamination process. Starting with the multi-layer assembly 615 of FIG. 6 in a supply roll 700, the liner 607 is removed 710. Then, soft rollers 720 may apply both pressure and heat, or only pressure to laminate the PSA 505*a* and beaded film 505*b* to a sheet substrate 730. In one embodiment, the sheet substrate 730 is rigid plastic (e.g., acrylic). In another embodiment, the sheet substrate 730 is glass. The result is a completed light filter 740, e.g., the light filters described in conjunction with FIGS. 2A and 2B, which is ready for inspection and shipping to a purchaser.

What is claimed is:

1. A light filter with a back surface for receiving incident light and a front viewing surface, comprising:
    a layer of substantially opaque material including front and back surfaces within the filter;
    a plurality of light transmissive beads disposed in a single-layer array within the layer of substantially opaque material with first portions of the beads penetrating through the front surface of the layer of opaque material to form light transmissive apertures and remaining portions of the beads protruding through the back surface of and not disposed within the layer of substantially opaque material to receive incident light;
    a light-dispersing material layer having asymmetrical dispersion characteristics along orthogonal axes, the light-dispersing material layer being interposed between the incident light and the remaining portion of the beads protruding through the back surface of and not disposed within the layer of substantially opaque material to disperse light incident on the light-dispersing material layer to enhance light transmission along one of the orthogonal axes relative to light transmission along another of the orthogonal axes, the light-dispersing material layer including within a material for scattering incident light; and
    a light polarizing layer interposed between the light transmissive apertures and the front viewing surface for improved rejection of ambient light.

2. The light filter according to claim 1, further comprising a conformal layer of transmissive material affixed to the back surface of the layer of substantially opaque material and the remaining portions of the beads to receive incident light.

3. The light filter according to claim 2, in which the beads have a radius R, and the thickness of the conformal layer is not greater than R.

4. The light filter according to claim 3, in which the thickness of the conformal layer is about ten percent (10%) of R.

5. The light filter according to claim 1, further comprising a support layer of transparent material, with a surface for receiving incident light and a viewing surface, disposed on the front surface of the layer of substantially opaque material.

6. The light filter according to claim 5, in which the light polarizing layer is interposed between the light transmissive apertures and the support layer.

7. The light filter according to claim 5, in which the light polarizing layer is on the viewing surface of the support layer.

8. The light filter according to claim 1, in which the light polarizing layer is adjacent to apertures.

9. The light filter according to claim 1, in which the light polarizing layer transmits linearly polarized image light aligned with the polarization axis of the polarizing layer.

10. The light filter according to claim 1, in which the light polarizing layer attenuates ambient light.

* * * * *